United States Patent [19]

Steele

[11] 4,205,453
[45] Jun. 3, 1980

[54] TOWING HITCH ALIGNMENT DIRECTOR

[76] Inventor: Richard W. Steele, 6551 Dume Dr., Malibu, Calif. 90265

[21] Appl. No.: 940,845

[22] Filed: Sep. 8, 1978

Related U.S. Application Data

[62] Division of Ser. No. 559,036, Mar. 17, 1975, Pat. No. 4,173,353.

[51] Int. Cl.² .................................... B60D 01/14
[52] U.S. Cl. .................... 33/180 AT; 33/1 PT; 33/139; 280/477; 340/52 R
[58] Field of Search .............. 33/1 N, 1 CC, 1 PT, 33/127, 129, 134 R, 138, 139, 141.5, 180 AT; 280/477; 340/52 R, 66, 70, 686

[56] References Cited

U.S. PATENT DOCUMENTS

| | | | |
|---|---|---|---|
| 2,736,885 | 2/1956 | Thompson | 340/52 R |
| 2,906,179 | 9/1959 | Bower | 33/1 CC |
| 3,731,274 | 5/1973 | Green | 280/477 |
| 3,734,539 | 5/1973 | Salmi | 340/52 R |
| 3,780,440 | 12/1973 | Taylor | 33/139 |
| 3,938,122 | 2/1976 | Mangus | 340/52 R |
| 4,030,775 | 6/1977 | Hill | 340/686 |

FOREIGN PATENT DOCUMENTS

| | | | |
|---|---|---|---|
| 2358599 | 6/1975 | Fed. Rep. of Germany | 280/477 |
| 529547 | 8/1955 | Italy | 280/477 |

Primary Examiner—Richard R. Stearns
Attorney, Agent, or Firm—Theodore H. Lassagne

[57] ABSTRACT

A device is provided for sensing the magnitude and direction of angular departures of a towing vehicle from a path which will bring a hitch mounted thereon into engageable relationship with a hitch mounted on a trailer, for registering the changing distance between such hitches, and for indicating the angular values and direction of such departures and the distance between hitches to an operator of the towing vehicle. The construction permits approach of the towing vehicle toward the trailer from any access angle without requiring adjustment of the device for different angles of approach and without introducing error. Automatic scale expansion of the distance indication occurs as the distance between the vehicles shortens.

5 Claims, 10 Drawing Figures

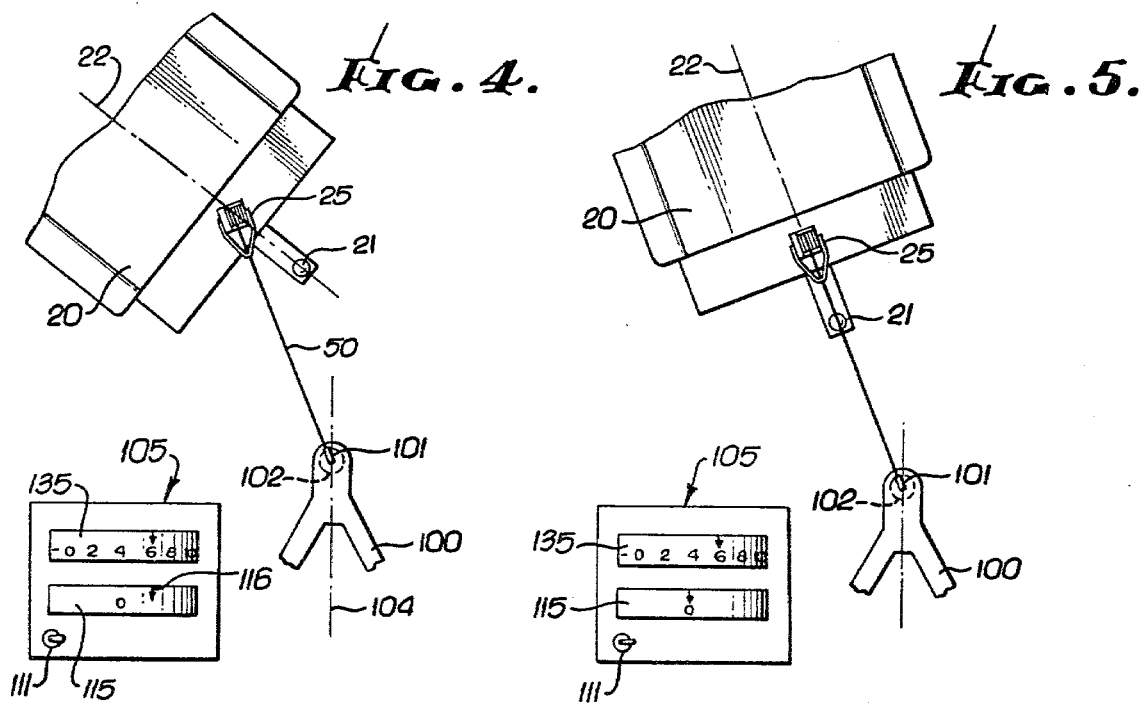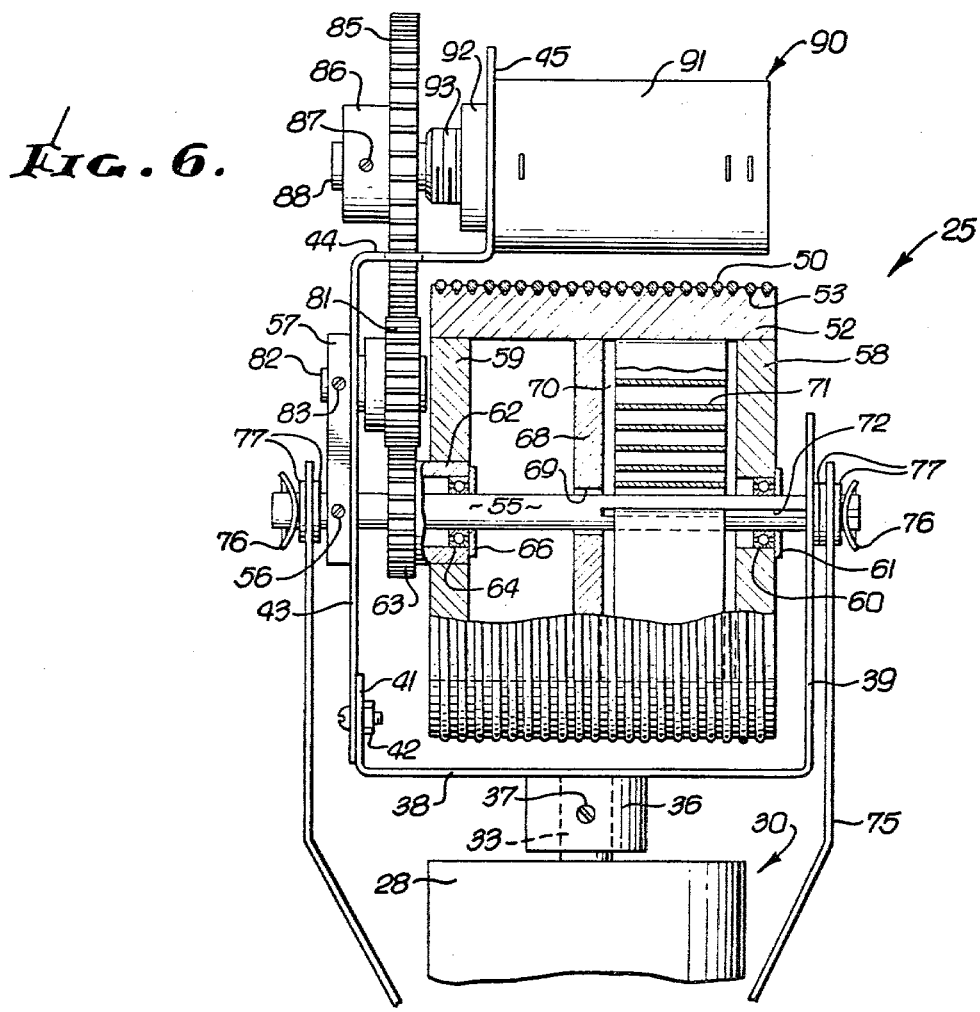

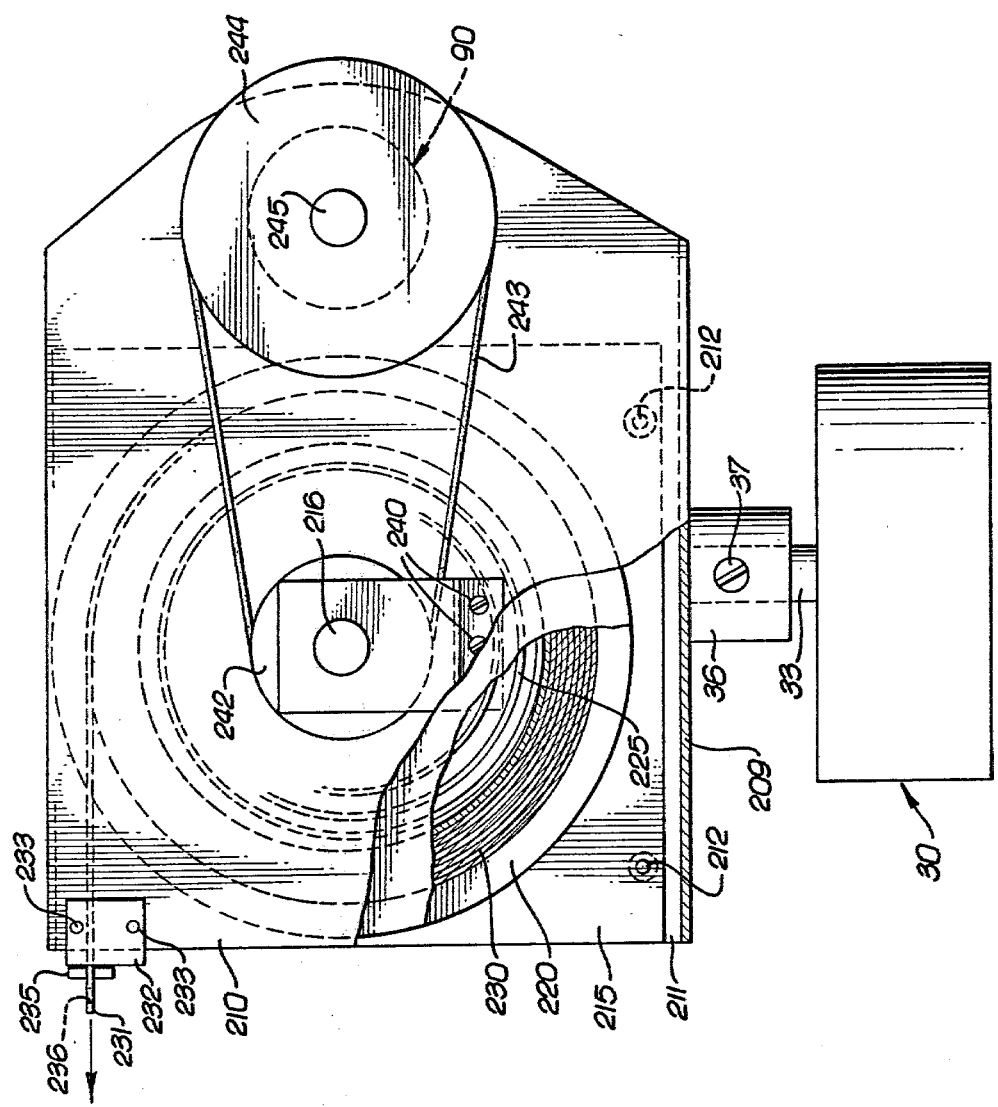
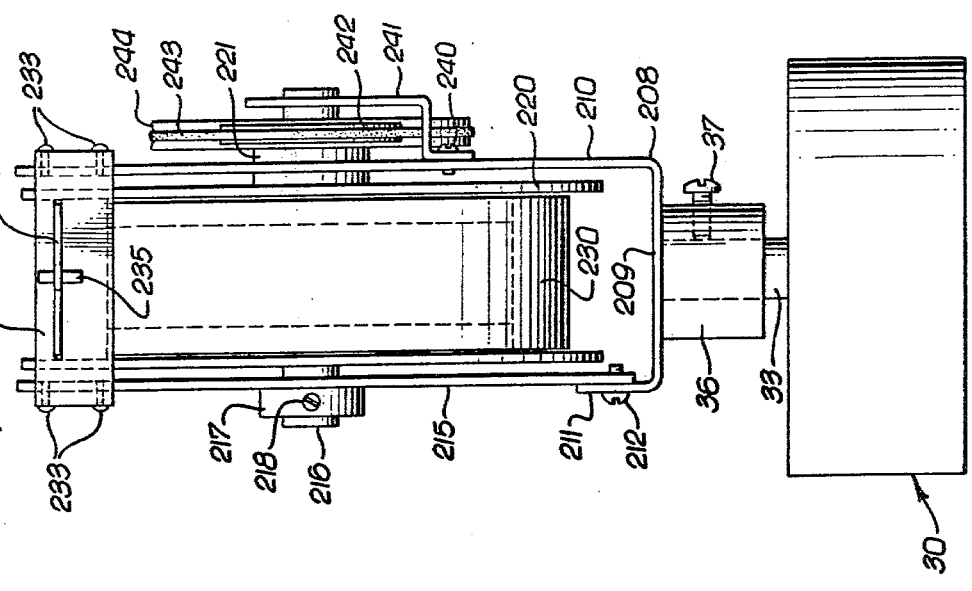

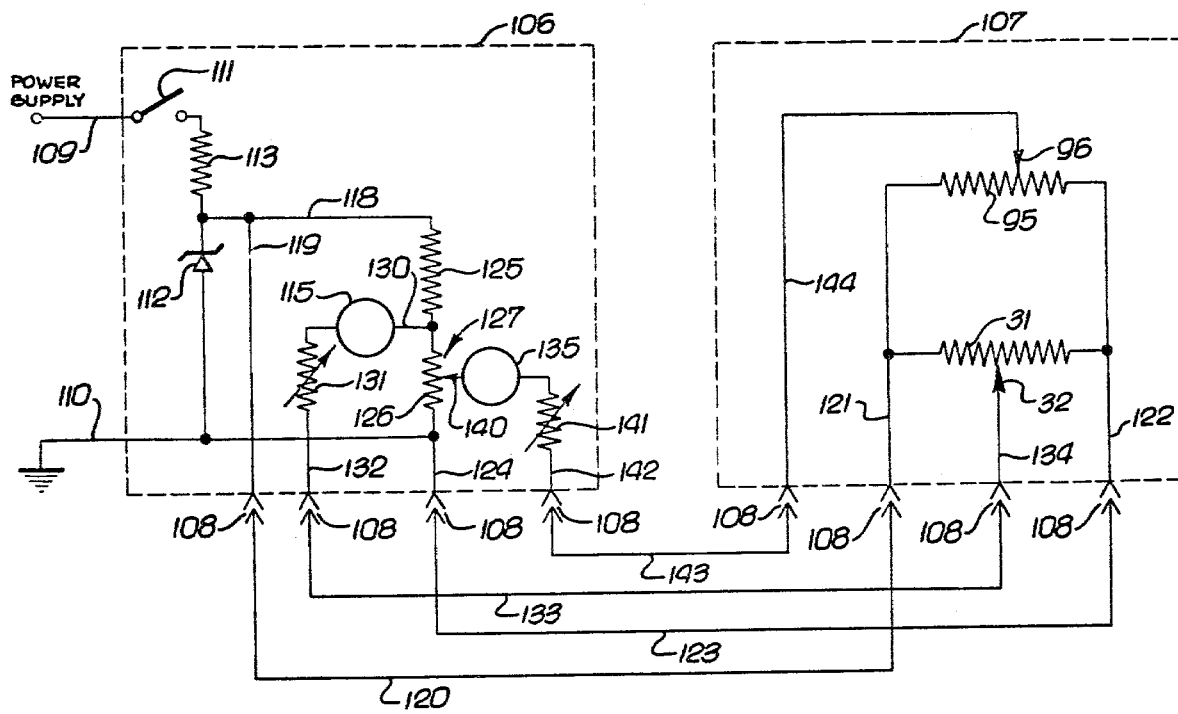
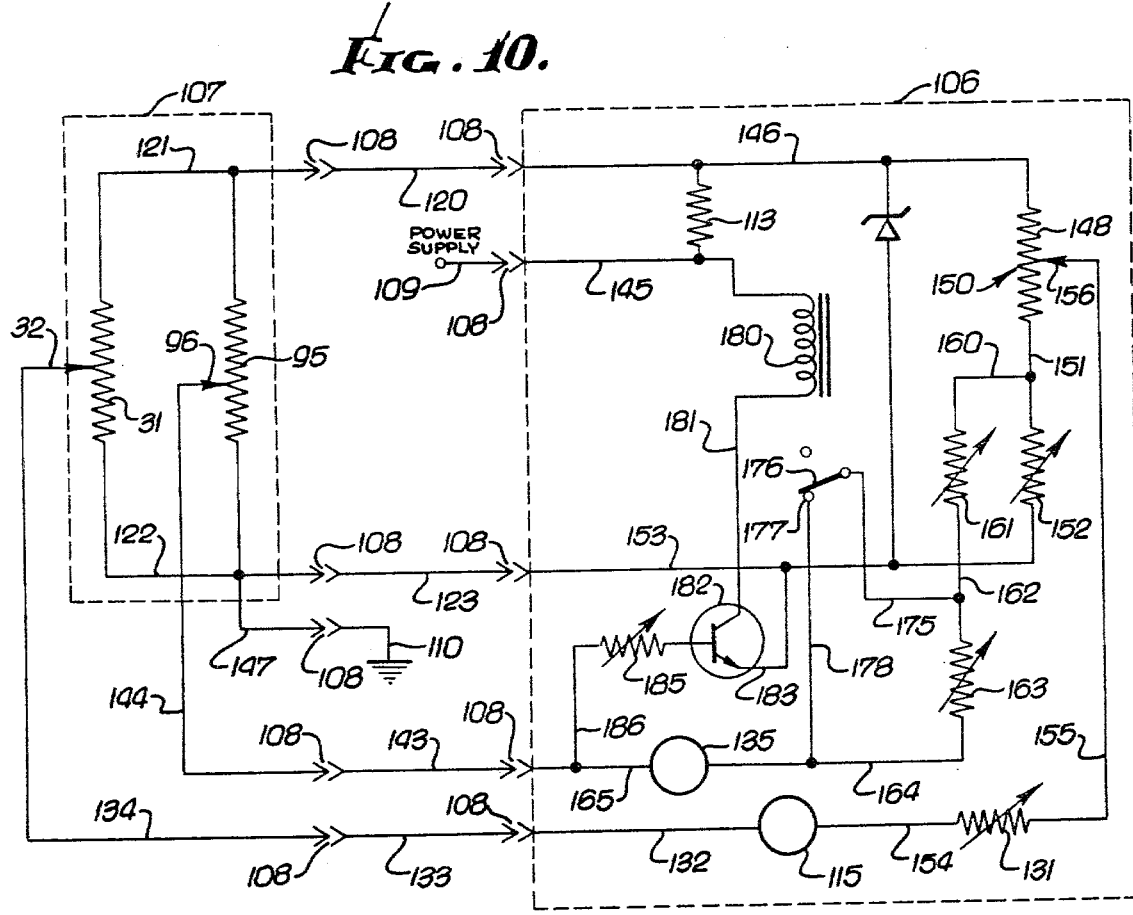

TOWING HITCH ALIGNMENT DIRECTOR

This is a division of application Ser. No. 559,036 filed Mar. 17, 1975, now U.S. Pat. No. 4,173,353.

BACKGROUND OF THE INVENTION

1. Field of the Invention

The present invention relates to devices for facilitating the connection of vehicles by registering and conveying information to an operator of one vehicle as to their changing positional relationship as the operator directs his vehicle along a path intended to bring hitches on the two vehicles into position for inter-engagement.

2. Description of the Prior Art

The increasing use of trailers, both in the commercial trucking industry and in the recreational and house trailer fields, has led to the development of a number of devices for facilitating the connection of a towing vehicle with a trailer. The need for such devices arises from the difficulty encountered in backing the towing vehicle into such a position with respect to the trailer that the hitches on the vehicles, the relative positions of which are concealed from the operator by the vehicle body, are positioned for inter-engagement.

One example of such a device is disclosed in the United States patent to Salmi, U.S. Pat. No. 3,734,539, in which a retractable guide line extends between the trailer and the towing vehicle and its deflections and its extension and retraction produce non-proportional signals purporting to enable the operator of the towing vehicle to direct it in the proper way to effect positioning of the hitches of the two vehicles for inter-engagement. The Salmi sensing device must, however, have its initial positioning changed, and the position of his guide line also must be changed, if the trailer is to be approached by the towing vehicle from different directions. Furthermore, it indicates only whether the angular error in the approach is to the right or left without indicating its magnitude. The operator thus is not informed as to the magnitude of the course correction required. Also, Salmi's means for indicating the approach of the towing vehicle's hitch to that of the trailer gives only "Caution" and "Stop" signals without indicating the magnitude of the distance between the hitches.

Another example of such a device is disclosed in the United States patent to Thompson, U.S. Pat. No. 2,736,885, in which deflections of a similar guide line extensible between the trailer and an unspecified point on the towing vehicle are caused to rock an arm pivoted on an axis located to one side of a line connecting the trailer and towing vehicle hitches and thus to mechanically deflect an angle indicator mounted on the trailer in a position to be viewed through the rear window of the towing vehicle. A light signal indicates contact between the portion of the device mounted on the towing vehicle and that mounted on the trailer. Because of the unspecified positioning of the guide line anchor on the towing vehicle and the positioning of the rockable arm pivot to the side of the trailer hitch, it appears that only approximate hitch alignment could be achieved with the Thompson device even in a straight-line approach and that hitch alignment would be impossible if it were necessary for the towing vehicle to approach the trailer at a substantial angle.

The primary object of the present invention is to remedy such deficiencies in the prior art devices. Thus, it is an object to provide a towing hitch alignment director which will quantitatively indicate departures in either direction from the selected angle of approach to a trailer by a towing vehicle, without any need for repositioning or adjustment of any portion of the director if the trailer is to be approached from other than a single predetermined direction. It is a further object to provide a director which will quantitatively and continuously indicate the distance between the hitch of one vehicle and that of another as they are moved toward each other. A further object is to provide for automatic scale expansion of the distance indication as the distance between the two vehicle hitches shortens.

SUMMARY OF THE INVENTION

In order to meet the need for a device capable of quantitatively and continuously informing the operator of a towing vehicle as to the steering corrections required to bring his vehicle into proper relationship with a trailer for hitching, both vehicles being equipped with hitches capable, when engaged, of limited pivotal movement with respect to each other about a common vertical axis, the device of the present invention is capable of registering the positive or negative character and the magnitude of the angle, in a horizontal plane, between a first line intersecting the vertical axes of the separated hitches, and a second line extending axially of the towing vehicle and intersecting the vertical axis of its hitch.

The first of these lines intersects two points, the first lying on the vertical axis of the towing vehicle's hitch, which lies on the vertical axis upon which that hitch pivots with respect to the other after the hitches are joined, and the second of which lies on the vertical axis of the trailer's hitch, which is the axis upon which that hitch pivots with respect to the other after the hitches are joined.

The second of these lines intersects the first of the two points intersected by the first line and a third point which lies at a position on the line extending axially of the towing vehicle forwardly of its hitch. When these three points lie on the same line during approach of the vehicles toward each other, the hitches will necessarily be brought into proper relationship for coupling. Therefore, registration and indication of any angular relationship existing between lines connecting the three points serves as a guide for the towing vehicle operator who is seeking to bring the hitches into engageable relationship.

The towing hitch alignment director of the present invention achieves the foregoing objects by the provision of a transducer unit adapted for mounting on a towing vehicle at the third of the points mentioned above and provided with an extensible sensor capable of being anchored to a trailer vehicle during coupling operations.

It is important that, in accordance with the present invention, the free end of the extensible sensor be anchored to the trailer vehicle during coupling operations, at a position essentially coaxial with the vertical axis upon which the couplings, when joined, are pivotable. This positioning makes it unnecessary to effect any adjustment or repositioning of the anchor when the towing vehicle approaches the other for coupling, regardless of the angle of approach; this being limited only by the configuration of the vehicle bodies.

The transducer unit includes a portion pivotally mounted for oscillatory movement about a vertical axis intersecting the third point mentioned above and the extensible sensor extends therefrom. Means are controlled by the oscillatory movement of the pivotally mounted portion and control a meter at the driver's station of the towing vehicle so that a directional and quantitative registration and indication of any departure in either direction from the selected angle of approach of the trailer vehicle will be given continuously as the vehicles move toward each other.

The transducer unit includes means controlled by the extension and retraction of the extensible sensor and which controls a second meter at the driver's station of the towing vehicle so that a continuous quantitative registration and indication of the distance between the hitch of one vehicle and that of the other is given as the vehicles move toward each other.

A scale expansion circuit is provided for automatically changing the scale factor of the distance meter indication when the distance between the vehicles shortens to a predetermined distance, which may be set as desired. In this way, for example, the last few inches of distance change may be displayed as covering the full scale of the distance meter.

A second anchor for the free end of the extensible sensor, spaced rearwardly along the axis of the trailer on a line passing through its hitch, is provided for use after coupling of the vehicles has been effected. By its use a continuous registration and indication of the angular relationship of the axes of the coupled vehicles may be obtained. This is desirable in many situations in which denting of the trailer by the towing vehicle would occur if, for example, the two vehicles were backed at an excessive angle.

BRIEF DESCRIPTION OF THE DRAWINGS

FIG. 4 is a diagrammatic illustration showing the indications displayed by the indicator of FIG. 2 as the towing vehicle approaches the trailer along a path which will fail to bring the hitch elements of the two vehicles into engageable relationship;

FIG. 5 is a similar diagrammatic illustration of the indications displayed by the indicator of FIG. 2 as the towing vehicle's path is altered so that it approaches the trailer along a path which will bring the hitch elements of the two vehicles into engageable relationship;

FIG. 6 is a view in frontal elevation and partially in section of the transducer unit of FIG. 1;

FIG. 7 is a view in frontal elevation of a modified form of transducer unit constructed according to the present invention;

FIG. 8 is a view in side elevation with portions broken away of the transducer unit of FIG. 7;

FIG. 9 is a circuit diagram of a director embodying the present invention; and

FIG. 10 is a circuit diagram of a modified form of the present invention.

DESCRIPTION OF THE PREFERRED EMBODIMENTS

The preferred embodiments of the vehicle coupling alignment director of the present invention are designed for use with a pair of vehicles, such as a towing vehicle and trailer, which have mounted on them complementary hitches, usually of the conventional ball and socket type, which are capable of pivotal movement about a vertical axis and limited universal movement with respect to each other when engaged.

The director itself comprises an angle and distance transducer designed to be mounted on the towing vehicle at a position displaced forwardly of that vehicle's hitch along its axis; that is, along the path of movement of the vehicle when it is steered straight ahead.

This transducer includes a sensor which is extensible from the transducer to an anchor point on the trailer, which anchor point is, for hitching purposes, located at a position substantially coincident with the vertical axis of pivotal engagement of the two hitches. Where the angular relation between hitched vehicles is to be measured, however, a second anchor point for the sensor is located at a position on the trailer displaced forwardly of that vehicle's hitch along its line of draft.

Finally, the director comprises an angle and distance registering and indicating unit located at the driver's station of the towing vehicle in a position visible to the driver.

Figure 1:
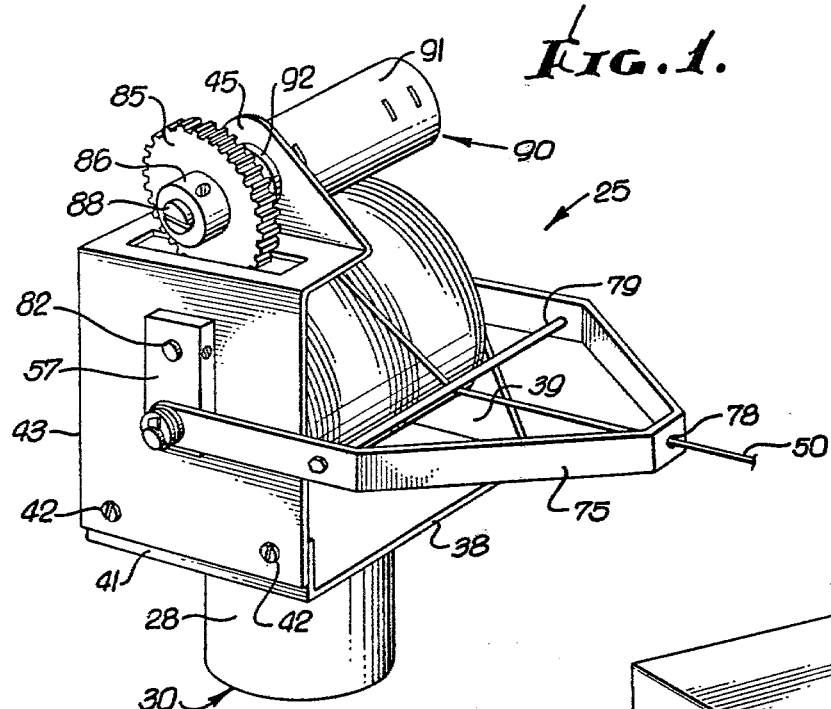
FIG. 1 is a view in perspective of a transducer unit constructed in accordance with the present invention.
Figure 2:
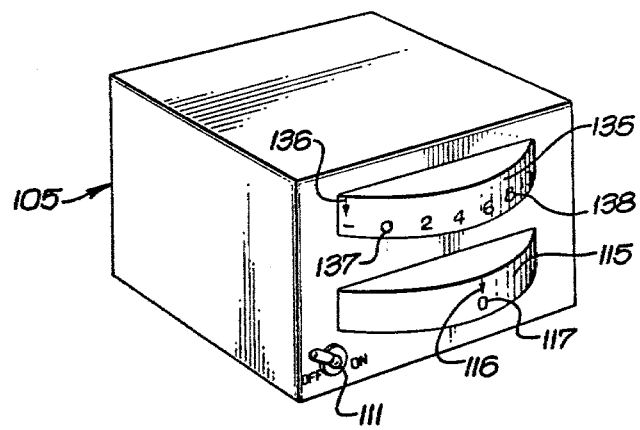
FIG. 2 is a view in perspective of an indicator unit constructed in accordance with the present invention.
Figure 3:
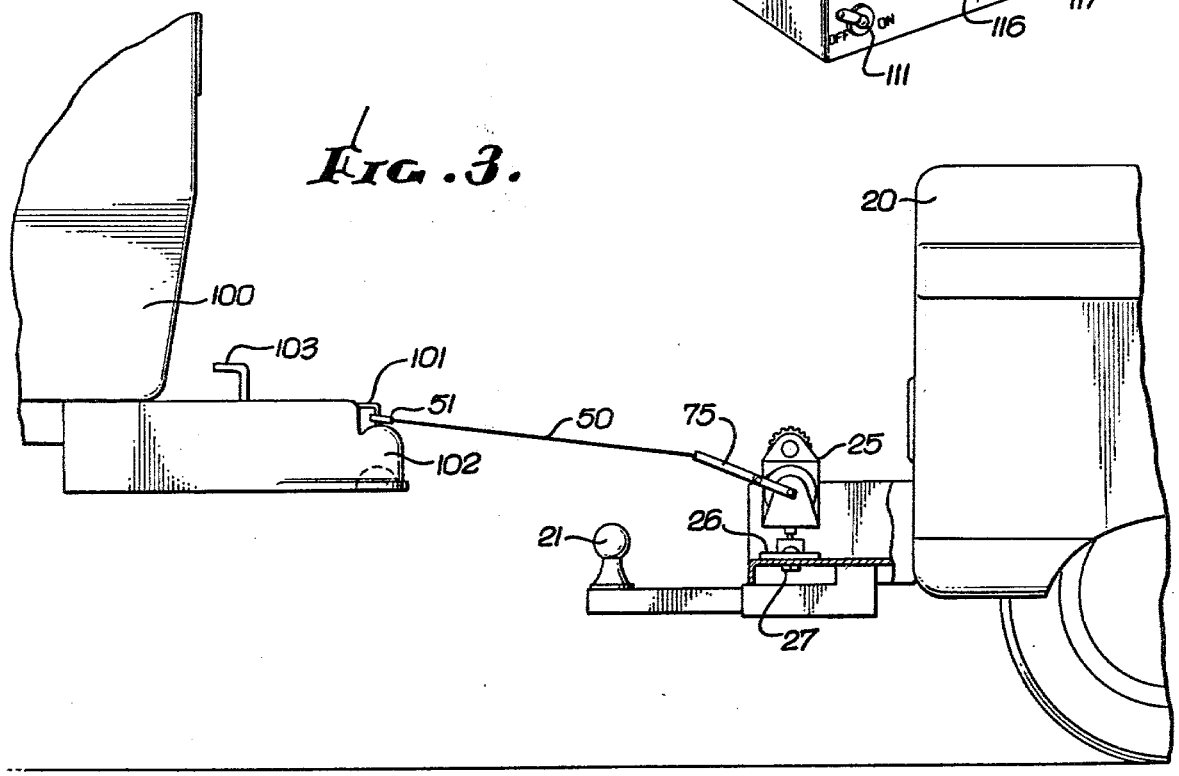
FIG. 3 is a view in side elevation illustrating the mounting of a ball hitch and of the transducer unit of FIG. 1 on the rear portion of a towing vehicle and the connection of its guide element to a hitch on the forward portion of a trailer vehicle.

As shown in FIGS. 1 to 6 and 9 of the drawing, the towing vehicle 20 (FIGS. 3, 4 and 5) has secured to it at a position displaced forwardly of its ball hitch 21 along its axis 22 (FIG. 4), an angle and distance transducer 25. The transducer 25 has a base 26 (FIG. 3) which may be releasably secured to the frame of the vehicle 20 by any suitable means such as a nut and bolt assembly 27.

Secured to the transducer base 26 is the casing 28 of a potentiometer 30 the winding 31 (FIG. 9) of which is fixed within the casing 30 and the slider 32 of which is attached to a rotatable shaft 33 (FIG. 6) extending through the top of the casing 30 supplying a vertical axis normal to the axis 22 of the towing vehicle 20.

The rest of the transducer 25 is secured to and supported by the shaft 33 and thus constitutes a means pivotally mounted for oscillatory movement about that axis. This structure comprises a collar 36 (FIG. 6) fitting over the upper end of the shaft 33 and secured thereto by means such as a set screw 37. Secured to the collar 36, as by welding, is a horizontal base plate 38 one edge of which is formed to provide a vertical side plate 39 and the opposite edge of which is formed to provide a vertical wing 41 to which is secured, as by nut and bolt assemblies 42 (see also FIG. 1), a second side plate 43 having a horizontally extending upper portion 44 and an offset upper portion 45. The potentiometer 30 thus constitutes a means for registering and producing an electrical signal proportional to the magnitude of the angular movement of the pivotally mounted portion of the transducer 25 about its vertical axis.

A sensor in the form of a flexible cord 50 having a free end provided with a hook 51 (FIG. 3) extensible from the pivotally mounted portion of the transducer 25 is carried by a drum 52 (FIG. 6) the periphery of which is spirally grooved as at 53 to receive the sensor cord 50. The drum 52 is rotatably mounted on a shaft 55 extending through opposite holes in the side plates 39 and 43 and secured against rotation by means such as set screw 56 threaded through a block 57 into contact with shaft 55; the block 57 being itself secured against rotation by means described hereinafter.

The rotatable mounting of the drum 52 on the shaft 55 is accomplished by supporting the drum 52 on discs 58 and 59 which form, respectively, right and left side walls of the drum 52 as viewed in FIG. 6. Disc 58 is rotatably supported on shaft 55 by a ball bearing 60 held in place by a plate 61 secured to the face of disc 58. A hub 62 integral with a spur gear 63 is secured to the disc 59 and is rotatably mounted on the shaft 55 by a ball bearing 64 held in place by a plate 66 secured to the end of the hub 62.

Means are provided for spring-rotating the drum 52 in the direction which will wind up the sensor cord 50 in the spiral groove 53 on its periphery. An internal wall 68 secured to the inside of the drum 52, and having a central hole 69 through which the shaft 55 passes, defines a compartment 70 which houses a spiral spring 71, one end of which is held in a slot 72 in the shaft 55 and the other end of which is secured to the inside of the drum 52.

Means are provided for limiting the rotation of the drum 52 by the spring 71 and for causing horizontal deflections of the extended sensor cord 50 to oscillate the pivotally mounted portion of the transducer 25 about the axis of shaft 33. Rockably mounted on the shaft 55 outwardly of the plates 39 and 43 is a yoke 75 separated from those plates and from press-nuts 76, which retain the yoke 75 against displacement, by spacers 77. At the center of the yoke 75 is a hole 78 (FIG. 1) through which sensor cord 50 passes and, preferably, the yoke 75 is reinforced by a cross-bar 79 under which the sensor cord 50 passes. The hook 51 is larger than the hole 78 and thus retraction of the sensor cord 50 by the spring 71 is limited by engagement of the hook 51 with the yoke 75. Also, as shown in FIGS. 4 and 5, horizontal deflections of the extended sensor cord 50 will oscillate the pivotally mounted portion of the transducer 25 about the axis of shaft 33 (FIG. 6).

Means are provided for registering the magnitude of the extension of the sensor cord 50 which, as will be made clear hereinafter, is proportionate to the distance between the hitches of the two vehicles when the director of the present invention is being employed in a hitching operation. The spur gear 63 (FIG. 6) meshes with an idler gear 81 rotatably mounted on a stub shaft 82 mounted in the side plate 43 and block 57 in which it is retained by means such as a set screw 83; this serving also to prevent rotation of the block 57 and shaft 55. Idler gear 81 meshes also with a potentiometer drive gear 85 the hub 86 of which is secured by means such as a set screw 87 to the shaft 88 of a multi-turn potentiometer 90, the casing 91 of which is secured to the offset upper portion 45 of plate 43 by a nut 92 threaded upon a reduced neck 93 of the casing 91.

The spiral winding 95 (FIG. 9) of the potentiometer 90 is fixed within the casing 91 while its movable contact 96 is driven along the spiral winding by rotation of the shaft 88. This arrangement, therefore, serves to register and produce an electrical signal proportional to the magnitude of the extension of the sensor cord 50 by transmitting rotation of the drum 52 through gears 63, 81 and 85 to shaft 88 and thus positioning the movable contact 96 of potentiometer 90 at a position on the winding 95 proportionate to the magnitude of the extension of the sensor cord 50 from the pivotally mounted portion of the transducer 25.

Means are provided for anchoring the hook 51 at the free end of the sensor cord 50 to either of two positions on a trailer 100 (FIG. 3) which is to be hitched to and towed by the vehicle upon which the transducer unit 25 is mounted. The first of these means is a pin 101 (FIGS. 3, 4 and 5) located at a position on the trailer's hitch 102 essentially coaxial with the vertical axis upon which the joined hitches are free to pivot. The second is a pin 103 located at a position on the trailer 100 displaced from its hitch 102 along its axis 104 (FIGS. 4 and 5).

Means are provided which, under control of the transducer unit 25, will indicate at a remote station such as the driver's station of the towing vehicle, the direction and magnitude of any horizontal angular movement of the extended end of the sensor cord 50 when the latter is anchored to either of the pins 101 or 103 of a towing vehicle. This means includes an indicator unit 105 (FIGS. 2, 4 and 5) and, as shown in FIG. 9, the circuitry housed in the indicator unit 105 is enclosed in the dotted rectangle 106, while that included in the transducer unit 25 is enclosed in the dotted rectangle 107. The two units are connected by four leads terminating at their opposite ends in plug and jack connectors 108. Power from the towing vehicle's battery is supplied to the indicator unit 105 via power lead 109 and grounded lead 110. A switch 111 (see also FIG. 2) is manually operable to control the power supply, and a Zener diode 112 connected in series with a 33 ohm dropping resistor 113 between the leads 109 and 110 maintains a constant voltage supply to the director notwithstanding fluctuations in the voltage supplied via leads 109 and 110. In the specific embodiment disclosed, the Zener diode 112 controls a nominal 12 volt D.C. supply to 8.2 volts, and similar exemplary value will be given hereinafter for all circuit components.

An angle indicating voltmeter 115 (FIGS. 2 and 9) having a pointer 116 (FIG. 2) movable in either direction from a central position on its scale 117 is controlled by the potentiometer 30 by means constituting a bridge circuit.

The first leg of this bridge circuit includes, from the power supply, lead 109, switch 111, resistor 113, leads 118 and 119, connector 108, lead 120, connector 108, lead 121, the 500 ohm winding 31 of potentiometer 30, lead 122, connector 108, lead 123, connector 108, lead 124 and lead 110 to ground. The second leg includes, from the power supply, lead 109, switch 111, resistor 113, lead 118, 200 ohm resistor 125, 200 ohm winding 126 of potentiometer 127, and lead 110 to ground. The voltmeter 115 is connected across the legs of this circuit by lead 130 to the meter, and from the meter by 5000 ohm resistor 131, which may be variable for calibration purposes, lead 132, connector 108, lead 133, connector 108 and lead 134 to the slider 32 of potentiometer 30.

This arrangement is such that when the slider 32 is located centrally of the winding 31, no voltage will be supplied to voltmeter 115. Under such circumstances the pointer 116 (FIG. 2) will be located centrally of its scale 117. However, movement of the slider 32 in either direction will cause a corresponding movement of the pointer 116 over its scale 117. Since the slider 32 is attached to the rotatable shaft 33 (FIG. 6) which is oscillated by horizontal angular movement of the extended end of the sensor cord 50 (FIGS. 4 and 5) carried by the transducer unit 25, the foregoing means will indicate at the indicator unit 25 the direction and magnitude of any horizontal angular movement of the extended end of the sensor cord 50.

As shown in FIG. 4, when the sensor cord 50 is anchored at 101 and the towing vehicle 20 is approaching the hitch 102 of the trailer 100 along a path to the right of the path (shown in FIG. 5) which would bring the hitches into engageable relation, the indicator 116 will be positioned to the right of its central position, telling the driver to turn the steering wheel counter-clockwise in order to bring the towing vehicle 20 onto the proper path, shown in FIG. 5, and the indicator 116 into its central position.

When the sensor cord 50 is anchored at 103 (FIG. 3), the vehicles being hitched together, the indicator 116 will indicate the direction of any departure of the vehicles from a common line of draft, in which their axes lie on a common line, and the angular value of any such departure, thus assisting the driver in avoiding impacting of the bodies of the vehicles during, for example, angular backing of the trailer into a narrow parking space fronting on an access way too narrow to permit straight-in backing.

Means are provided which, under control of the transducer unit 25, will indicate at the remote station previously described, the distance between the hitches of the two vehicles when the director is being employed in a hitching operation; the sensor cord 50 being extended and anchored to the pin 101 of the trailer 100 during such an operation.

A distance indicating voltmeter 135 having a pointer 136 (FIG. 2) movable in either direction from a "zero" indication 137 on a scale 138 is controlled by the potentiometer 90 (FIG. 1) by means constituting a second bridge circuit.

One leg of this bridge circuit is the second leg of the bridge circuit controlling the angle indicating voltmeter 115, including, from the power supply, lead 109, switch 111, resistor 113, lead 118, resistor 125, the winding 126 of potentiometer 127 and lead 110 to ground. The second leg of the bridge circuit controlling the distance indicating voltmeter 135 includes, from the power supply, lead 109, switch 111, resistor 113, lead 118, lead 119, connector 108, lead 120, connector 108, lead 121, the 200 ohm winding 95 of potentiometer 90, lead 122, connector 108, lead 123, connector 108, lead 124, and lead 110 to ground. The voltmeter 135 is connected across the legs of this circuit by slider 140 of potentiometer 127, adjustable for calibration purposes, to the meter and from the meter by 50,000 ohm variable resistor 141, lead 142, connector 108, lead 143, connector 108, and lead 144 to the slider 96 of potentiometer 90.

This arrangement is such that when the sensor cord 50 (FIG. 3) is completely retracted so that the hook 51 engages the yoke 75, the slider 96 (see also FIG. 9) will be at an end position on the winding 95 and the pointer 136 (see also FIG. 2) will be below zero on the scale 138 at a position which may conveniently be designated by a minus sign. The hook 51 is then engaged with the pin 100 of a trailer to be hitched to the towing vehicle 20 and the towing vehicle is moved to a position in which its ball hitch 21 is directly under the socket of the trailer's hitch 102. The hitches are then in engageable relationship and, by adjustment of the slider 140 (FIG. 9) of potentiometer 127, the pointer 136 (FIG. 2) can be accurately aligned with the zero position 137 on the scale 138. Thereafter the meter 135 will indicate not only the distance between the hitches of the vehicles, but will also indicate, by reading "minus", any overshooting of the towing vehicle 20 bringing its hitch too close to the trailer 100 for engagement of the hitches.

The circuit diagram of FIG. 10 shows a modification of the circuit diagram of FIG. 9 in which corresponding elements have been given the same reference numerals and in which it will be noted that the elements within the rectangle 107 are identical with those of FIG. 9. This modification provides means adjustable by the operator to expand the scale of the distance indicating meter 135 when the two vehicles have approached to within a preselected distance of each other. By this means, for example, when the vehicles have approached within, say, one foot of hitch alignment, the indicator of meter 135 would automatically return to its maximum distance indication and then return over its full scale to zero during the further movement of the vehicles toward each other.

The first leg of the bridge circuit controlling the angle indicating voltmeter 115 in the modification shown in FIG. 10 includes, from the power supply, lead 109, connector 108, lead 145, resistor 113, lead 146, connector 108, lead 120, connector 108, lead 121, winding 31, lead 122, lead 147, connector 108, and lead 110 to ground. The second leg includes, from the power supply, lead 109, connector 108, lead 145, resistor 113, lead 146, 500 ohm winding 148 of potentiometer 150, lead 151, 25 ohm variable resistor 152, lead 153, connector 108, lead 123, connector 108, leads 122 and 147, connector 108 and lead 110 to ground. The meter 115 is connected across the legs of this bridge circuit by slider 32 of potentiometer 30, lead 134, connector 108, lead 133, connector 108, lead 132 to meter 115, and from the meter by lead 154, variable resistor 131, and lead 155 to the slider 156 of potentiometer 150.

The first leg of the bridge circuit controlling the distance indicating voltmeter 135 in the modification shown in FIG. 10 is the same as the second leg of the bridge circuit controlling the angle indicating voltmeter 115 of this modification, including, from the power supply, lead 109, connector 108, lead 145, resistor 113, lead 146, winding 148, lead 151, variable resistor 152, lead 153, connector 108, lead 123, connector 108, leads 122 and 147, connector 108 and lead 110 to ground. The second leg includes, from the power supply, lead 109, connector 108, lead 145, resistor 113, lead 146, connector 108, lead 120, connector 108, lead 121, winding 95, lead 147, connector 108 and lead 110 to ground. The voltmeter 135 is connected across the legs of this circuit by lead 160, 5000 ohm variable resistor 161, lead 162, 50,000 ohm variable resistor 163 and lead 164 to the meter and from the meter by lead 165, connector 108, lead 143, connector 108, and lead 144 to the slider 96 of potentiometer 90.

Means responsive to changes in the voltage of this circuit including the voltmeter 135 are provided for altering the resistance included in that circuit so as to expand the scale factor of voltmeter 135 at a selected point in the approach of the towing vehicle toward the trailer. This means comprises a shunt circuit for resistor 163 including a lead 175, relay armature 176, relay contact 177, and lead 178. The relay armature 176 is controlled by a relay winding 180 which is included in a circuit including, from the power supply, lead 109, connector 108, lead 145, relay winding 180, lead 181, the collector and emitter of a 2N2102 transistor 182, lead 183, lead 153, connector 108, lead 123, connector 108, leads 122 and 147, connector 108 and lead 110 to ground. The base of transistor 182 is connected through 250,000 ohm variable resistor 185 and lead 186 to the previously described circuit including voltmeter 135.

This arrangement is such that so long as the voltage in the circuit including the voltmeter 135 is above a level determined by the adjustment of variable resistor 185, the transistor 182 will conduct and the circuit including relay winding 180 will be energized. Such energization maintains the armature 176 out of contact with the relay contact and the variable resistor 163 is therefore maintained connected in series with voltmeter 135. When the voltage in the circuit including voltmeter 135 falls to that predetermined level, however, transistor 182 ceases to conduct and relay winding 180 is thus deenergized. Upon such deenergization, armature 176 drops into contact with relay contact 177 shunting out variable resistor 163 to reduce the resistance included in the circuit of voltmeter 135 and thus expand its scale for the remainder of the downward travel of slider 96 over winding 95.

It will be noted that the modification shown in FIG. 10 does not include the switch 111 of the embodiment shown in FIG. 9. The provision of this switch in the modification shown in FIG. 10 is made unnecessary by supplying power through lead 109 and connector 108 to lead 145 located in the indicator unit 105 but providing a ground connection only through lead 147 located in the transducer unit 25, connectable to ground through connector 108 and lead 110. Thus no power circuit is completed until the indicator unit 105 and transducer unit 25 are connected together, and each is connected, respectively, to the power supply and to ground.

FIGS. 7 and 8 of the drawing illustrate a simplified form of the transducer unit of the present invention in which a flat metal tape form of sensor is substituted for the sensor cord of the embodiment of the invention shown in FIGS. 1 to 6. This makes possible the elimination of the yoke 75 because such a tape is sufficiently rigid in a plane paralleling the axis of the drum upon which it is wound, to transmit angular deviations to the pivotally mounted portion of the transducer unit.

The embodiment shown in FIGS. 7 and 8 is identical with that of FIGS. 1 to 6, 9 and 10 except in the respects hereinafter described. As in the first described embodiment the transducer unit comprises a portion pivotally mounted for oscillatory movement about a vertical axis which is supported on the rotatable shaft 33 of the one-turn potentiometer 30 by means of a collar 36 secured to the shaft 33 by means such as the set screw 37.

Secured to the collar 36, as by welding, is a plate 208 having a horizontal base portion 209, a side plate portion 210, and an opposite wing 211 to which is attached, as by bolts 212, a second side plate 215. Secured in position between the side plates 210 and 215 is a shaft 216 which is held against rotation by a collar 217 secured, as by welding, to side plate 215 and having threaded therein a set screw 218 engaging the shaft 216.

Rotatably mounted on the shaft 216 is a drum 220 having a hub 221 extending through the side plate 210. A helical spring 225 wound around shaft 216 within the drum 220 has its inner end secured to the shaft 216 and its outer end secured to the drum 220 and is tensioned in the proper direction to cause rotation of the drum 220 in a clockwise direction as viewed in FIG. 8. Helically wound around the drum 220 outwardly of the spring 225 is a flat metal sensor tape 230 having its inner end secured to the drum 220 and its outer, free end 231 extended through a slot in a bracket 232 secured at its opposite ends, as by rivets 233, to the two side plates 210 and 215. A pin 235 secured to the tape 230 adjacent its free end 231 prevents retraction of the end of the tape through the slot in bracket 232 and a hole 236 is provided adjacent the free end 231 of the tape for anchoring it to pin 101 or pin 103 on trailer vehicle 100.

The side plate 210 has secured thereto by means such as screws 240, a bracket 241 through which one end of the shaft 216 extends. Journaled on the shaft 216 between side plate 210 and bracket 241 is a cog gear 242 which is secured to the hub 221 of the drum 220. A cog belt 243 of the type commonly employed in servo systems connects the cog gear 242 with a second cog gear 244 fixed to the shaft 245 of a multi-turn potentiometer 90 corresponding to the potentiometer 90 of the embodiment shown in FIGS. 1 to 6, 9 and 10 and secured to the side plate 210 in the same manner as the corresponding potentiometer is secured to the offset upper portion 45 of the plate 43 as shown in FIG. 6.

In the operation of the director of the present invention the towing vehicle and trailer, which are provided with complementary hitches of the character described, are first brought into proximity with their hitches close enough together so that the sensor cord 50 or sensor tape 230 can be extended to reach the trailer's hitch. The sensor (50 or 230) is then manually extended and anchored to the pin 100 of the trailer and the switch 130, in the embodiment in which it is provided, is closed.

The indicator 135 then will indicate on its scale the distance between the hitches of the two vehicles, while the indicator 115 will indicate on its scale the direction and magnitude of any angular deviation of the line of draft of the towing vehicle from a line of draft which would bring the hitches of the vehicles into engageable relationship. It is to be emphasized that it is not necessary for the line of draft of the towing vehicle to be coincident with or parallel to the line of draft of the trailer in such an operation. The magnitude and direction of any angular deviation from the selected angle of approach will be correctly shown regardless of the angle at which the vehicles approach each other.

As the towing vehicle is backed toward the trailer, it is steered so as to bring the indicator 114 (FIGS. 4 and 5) to a position centrally of its scale thus insuring that so long as the indicator is kept there, the hitch 21 of the towing vehicle will be directed along a path bringing it into engageable relationship with the hitch 103 of the trailer. Normally the hitches are vertically separated by elevation of the trailer hitch during such an operation, but when the hitches have been brought into vertical alignment, the trailer hitch is lowered into engagement with the towing vehicle's hitch.

During the backing of the towing vehicle in such an operation the indicator 135 will continuously indicate the distance remaining to be traveled before the hitches are brought into engageable relationship. If the director embodies the modification shown in FIG. 10, the scale upon which this distance is indicated will be expanded automatically when the vehicles reach a predetermined distance from each other, which is determined by the adjustment of the variable resistor 155.

When, after the vehicles have been hitched together, it is desired to indicate to the operator the angular relationship of the axes, or normal lines of draft, of the two vehicles, the sensor cord or tape is anchored to the pin 101 instead of to the pin 100 of the trailer. The indicator 115 will then indicate the direction and magnitude of any deviation from coincidence of the vehicle axes, thus making it possible to avoid damage to the vehicle bodies arising from excessive angular deviations of this kind.

I claim:

1. A towing hitch alignment director transducer comprising a first potentiometer adapted for mounting on a vehicle and having a rotatable shaft extending therefrom; reel means carried by said shaft including spring means for rotating said reel means in one direction, and an extensible sensor carried by said reel means and effective upon extension thereof to rotate said reel in the opposite direction; a second potentiometer having a rotatable shaft and an operating connection between the shaft of said second potentiometer and said reel means whereby said shaft will be rotated by said reel means in response to extension and retraction of said extensible sensor.

2. A transducer according to claim 1 including a yoke carried by said reel means and having a hole through which said extensible sensor passes, whereby deflections of the extended sensor will cause rotational movements of the shaft of said first potentiometer.

3. A transducer according to claim 2 in which said extensible sensor is in the form of a flexible flat tape.

4. A towing hitch alignment director transducer comprising a potentiometer having a rotatable shaft extending substantially vertically therefrom, reel means carried by said rotatable shaft; said reel means having a central shaft disposed on a substantially horizontal axis and spring means for rotating said reel means in one direction, an extensible sensor carried by said reel means and effective upon extension thereof to rotate said reel means in the opposite direction, and means operable by said sensor, when extended, upon movement thereof substantially horizontally for rotating the shaft of said potentiometer; said last named means comprising a member extending from the central shaft of said reel means and having an aperture radially displaced from said shaft through which aperture said extensible sensor passes.

5. A transducer according to claim 4 in which said extensible sensor is in the form of a flexible flat tape.

* * * * *